US012768970B2

(12) United States Patent
Røtvold

(10) Patent No.: US 12,768,970 B2
(45) Date of Patent: Oct. 20, 2026

(54) METHOD FOR DETERMINING A CURRENT POSITION AND/OR ORIENTATION OF A LASER RADAR RELATIVE TO AN OBJECT TO BE MEASURED

(71) Applicant: METRONOR INDUSTRIAL AS, Nesbru (NO)

(72) Inventor: Øyvind Røtvold, Billingstad (NO)

(73) Assignee: Metronor Industrial AS, Nesbru (NO)

( * ) Notice: Subject to any disclaimer, the term of this patent is extended or adjusted under 35 U.S.C. 154(b) by 281 days.

(21) Appl. No.: 18/260,734

(22) PCT Filed: Dec. 30, 2021

(86) PCT No.: PCT/EP2021/087853
§ 371 (c)(1),
(2) Date: Jul. 7, 2023

(87) PCT Pub. No.: WO2022/152572
PCT Pub. Date: Jul. 21, 2022

(65) Prior Publication Data

US 2024/0069178 A1 Feb. 29, 2024

(30) Foreign Application Priority Data

Jan. 12, 2021 (EP) .................................... 21151216

(51) Int. Cl.
*G01S 7/497* (2006.01)
*G01S 17/42* (2006.01)
(Continued)

(52) U.S. Cl.
CPC ............ *G01S 7/4972* (2013.01); *G01S 17/42* (2013.01); *G01S 17/86* (2020.01); *G06T 7/74* (2017.01); *G06T 2207/10028* (2013.01)

(58) Field of Classification Search
CPC ........ G01S 7/4972; G01S 17/42; G01S 17/86; G01S 17/36; G01S 5/163; G01S 17/88;
(Continued)

(56) References Cited

U.S. PATENT DOCUMENTS

2006/0227210 A1* 10/2006 Raab ...................... G01S 5/163 348/139
2014/0211999 A1 7/2014 Kwiatkowski
(Continued)

FOREIGN PATENT DOCUMENTS

CN 108700665 A * 10/2018 ............ G01S 17/93
EP 0880674 B1 2/2002
(Continued)

OTHER PUBLICATIONS

Communication Pursuant to Article 94(3) of the European Patent Convention; EP Application No. 21847520.0; Aug. 23, 2024.
(Continued)

*Primary Examiner* — Md M Rahman
(74) *Attorney, Agent, or Firm* — Kilpatrick Townsend & Stockton LLP

(57) ABSTRACT

The present disclosure is directed to a method for determining a current position and/or orientation of a laser radar relative to an object by a computer. A camera system is attached to the laser radar. In the method, the position of the camera system is determined by obtaining one or more images of the object. At least three reference targets having a fixed spatial relationship to the target are observed in the one or more images. The relative spatial relationship and/or the position of the at least three reference targets on the object to each other is obtained from a storage. The position of the reference targets relative to the camera is calculated by using the relative spatial relationship of the at least three reference targets to each other and the observed spatial
(Continued)

directions to said reference targets defined relative to a camera fixed coordinate system.

16 Claims, 5 Drawing Sheets

(51) Int. Cl.
*G01S 17/86* (2020.01)
*G06T 7/73* (2017.01)

(58) Field of Classification Search
CPC . G06T 7/74; G06T 2207/10028; G01B 11/26; G01B 11/002
USPC ..................................................... 356/6
See application file for complete search history.

(56) References Cited

U.S. PATENT DOCUMENTS

2015/0100162 A1* 4/2015 Lin ........................ B25J 9/0093 700/259
2017/0094752 A1 3/2017 Chen
2017/0171944 A1 6/2017 Kim et al.
2018/0135969 A1 5/2018 Vandenhoudt et al.
2020/0049486 A1 2/2020 Christine et al.
2020/0089971 A1 3/2020 Li et al.
2020/0309515 A1 10/2020 Lüthi et al.
2021/0319586 A1* 10/2021 Rogers ............... G01B 11/2755
2022/0026547 A1* 1/2022 Zhang ....................... G06T 7/80

FOREIGN PATENT DOCUMENTS

EP 3361213 A1 * 8/2018 ........... G01S 19/485
JP 2018-189618 A 11/2018
WO 9307443 A1 4/1993
WO 9714015 A1 4/1997
WO 01/07866 A1 2/2001

OTHER PUBLICATIONS

European Search Report mailed on Jun. 14, 2021 in related application No. EP21151216.5, 11 pages.
International Search Report and Written Opinion mailed on Apr. 7, 2022 in International Patent Application No. PCT/EP2021/087853, 14 pages.

* cited by examiner

METHOD FOR DETERMINING A CURRENT POSITION AND/OR ORIENTATION OF A LASER RADAR RELATIVE TO AN OBJECT TO BE MEASURED

CROSS-REFERENCES TO RELATED APPLICATIONS

This application is a U.S. National Stage of PCT International Application No. PCT/EP2021/087853 by RØTVOLD, entitled "METHOD FOR DETERMINING A CURRENT POSITION AND/OR ORIENTATION OF A LASER RADAR RELATIVE TO AN OBJECT TO BE MEASURED," filed Dec. 30, 2021, which claims the benefit of and priority to European Application No. 21151216.5 by RØTVOLD, entitled "METHOD FOR DETERMINING A CURRENT POSITION AND/OR ORIENTATION OF A LASER RADAR RELATIVE TO AN OBJECT TO BE MEASURED," filed Jan. 12, 2021, which are hereby incorporated by reference in their entirety.

BRIEF DESCRIPTION OF THE DRAWINGS

Non-limiting embodiments of the invention are described, by way of example only, with respect to the accompanying drawings, in which.

DETAILED DESCRIPTION OF THE INVENTION

The present invention relates to a method for determining a current position and/or orientation of a measurement system including a laser radar relative to an object to be measured with said system.

A laser radar is known in the prior art and may be a device for measuring XYZ coordinates by a computer-controlled, steerable laser beam. The distance to a point of interest is determined by some characteristic of a reflected laser beam from said point, such as e.g. the phase shift. The direction to the point of interest is determined from the current orientation of the beam steering mechanism, typically a mirror or prism rotatable around two perpendicular axes.

Figure 1:
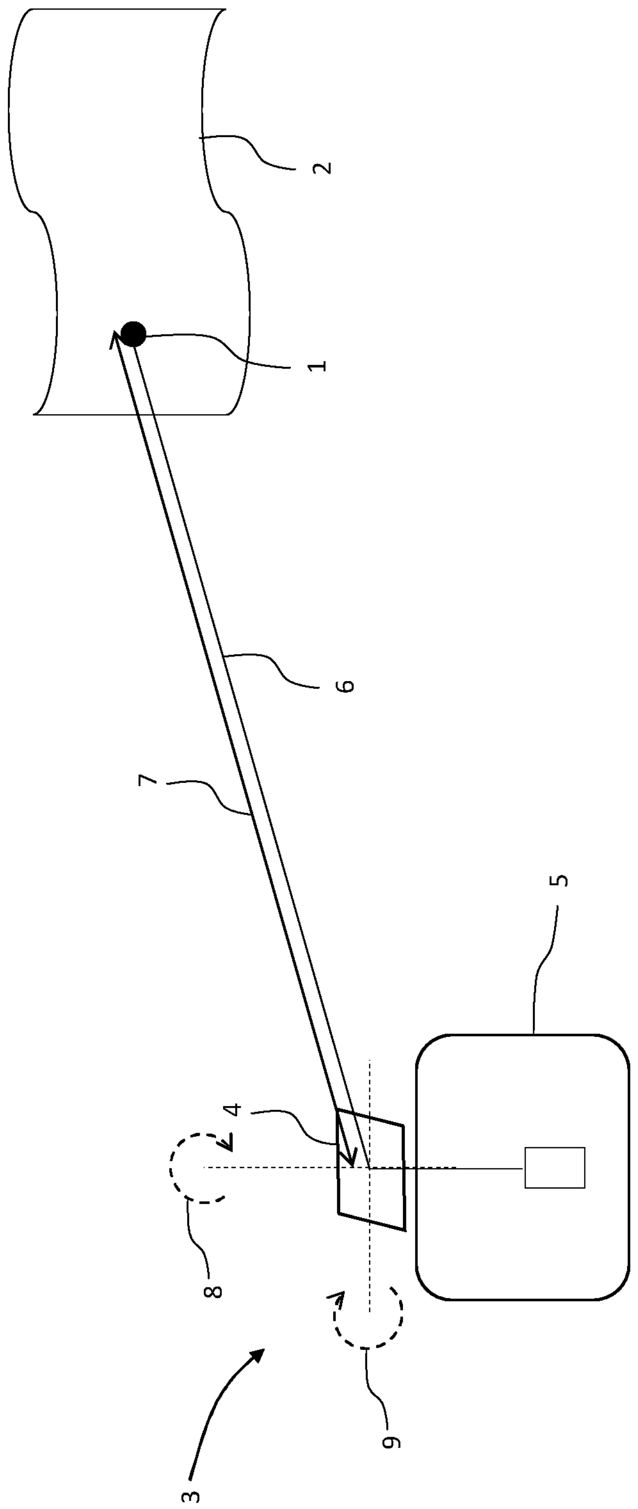
FIG. 1 shows a laser radar as known in the prior art.

As shown in FIG. 1, XYZ coordinates of a point 1 on an object 2 can be calculated from the range and direction information from the laser radar 3. A steerable mirror or prism 4 is shown on top of the laser radar main body 5 directing the beam 6 onto point 1 and recording the range 7. The XYZ value of point 1 is determined from the readings of the vertical 8 and horizontal 9 angles of the mirror or prism relative to the main body 5, as well as the range or distance data from the laser rangefinder.

Laser radars, also referred to as LIDARs or LADARs, are commercially available and generally used to scan—that is, measure a number of points of interest very quickly—objects and surfaces in industry, architecture, civil engineering and other industries.

Laser radars typically can steer their laser beam to a large range of angles and record such angles with high accuracy, giving excellent coverage e.g. of the inside of a cuboid. However, laser radars typically rely on direct line-of-sight and therefore cannot measure any portion of an object not in direct line-of-sight from their current position—to cover e.g. the entire outside surface of a fixed cuboid the laser radar therefore has to be moved.

Laser radar XYZ data may be relative to the position of the device main body—if the device is moved from a known position and orientation, then precise information of the new position and orientation is needed in order to correlate data taken before and after the move into a common coordinate system.

Robots are also known in the prior art and may be understood herein as a computer controlled mechanical mechanism capable of moving a mechanical interface into a multitude of positions and orientations. Said mechanical interface—used to attach the tool or other device being moved—is often referred to as the Tool Center Point (TCP). Various robot embodiments exist that use means of linear or rotational movement or combinations of these and provide TCP movement in varying number of degrees-of-freedom. The position and orientation of the TCP at a given point in time is typically determined by simultaneous readings from a series of sensors or encoders assigned to each of the axial or linear movements.

Figure 2:
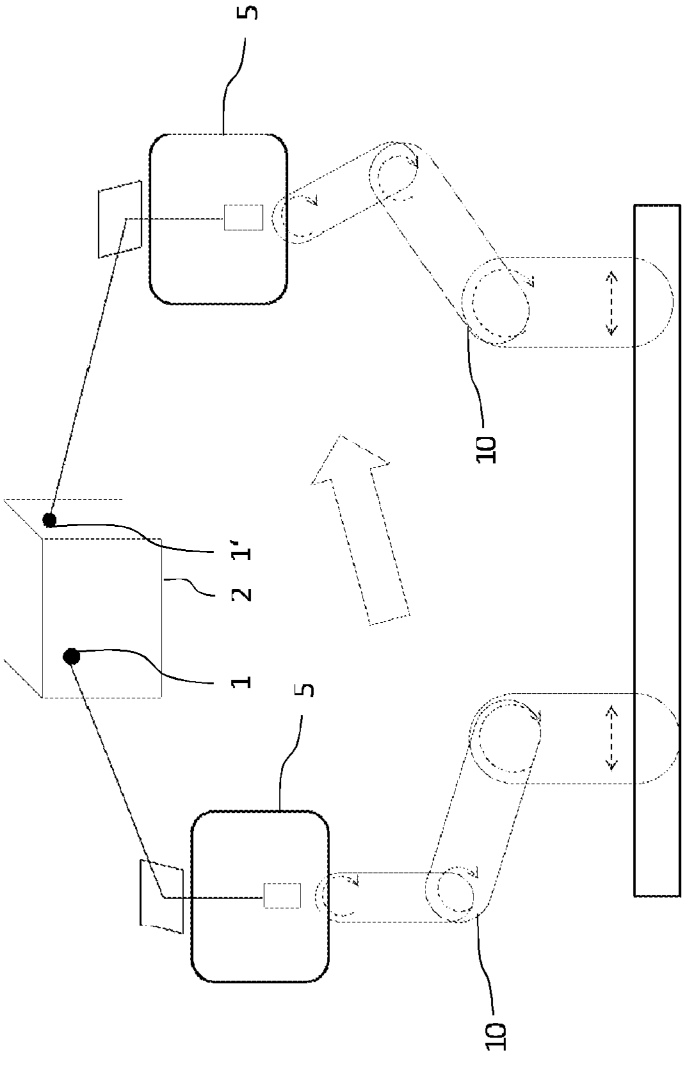
FIG. 2 shows a laser radar with a robot as known in the prior art.

As shown in FIG. 2, where the radar main body is moved around the object 2 with a robot 10, it is advantageous to use the robot 10 to be able to measure a larger portion of that object than would be possible from a single position. A robot mounted laser radar could combine the information from the laser radar with information from the robot controller in order to determine a consistent set of XYZ data from any area of the object. Unfortunately, while most robots have accuracies sufficient for industrial tasks such as painting, welding and assembly, only special and quite expensive robots have the accuracy required to provide movement information sufficiently precise to not significantly degrade the overall accuracy of XYZ data from a laser radar moved by said robot. High precision robots may also be of modest size and limited degrees-of-freedom, be unable to operate precisely in the extended temperature ranges encountered in production lines, and may require frequent maintenance or calibration, which is unacceptable in a production environment.

When using a laser radar moved by a robot for precise measurements it is typical to use the laser radar itself to determine its' current position and orientation. This is typically done by measuring at least three features—often tooling balls—in known positions on or about the object, after each robot move.

However, this approach has disadvantages if it is used inside e.g. automotive production lines and similar applications. These have limited cycle times, meaning that the object to be measured is stationary only for a finite amount of time—typically from 30 to 90 seconds. A production cell intended for dimensional monitoring is required to measure as many features on the object as possible during the available cycle time. The process of using the laser radar to determine the laser radar's current position and orientation after each move, therefore limits the applicability of the laser radar. For example, to measure a single feature—say a slot—in a difficult to access area of a car body, it may be necessary to move the laser radar to a dedicated location, then measure at least three known features such as tooling balls to determine the laser radar's precise location and then to measure the slot itself. Clearly, the vast majority of time is lost in preparatory process steps, not in measuring the desired object feature. This is particularly relevant for objects requiring multiple robot moves, such as a complete automotive body, where this challenge is severely limiting the laser radar's applicability.

It is known from prior art that the position and orientation of a robot mounted surface measurement device, such as an optical scanner, can be determined very quickly by stiffly mounting the scanner inside a navigation frame, and embedding a large number of targets on said frame to secure that at least three widely separated targets are visible from any direction. The frame can then be observed by a number of cameras or pairs of cameras operating in the object coordinate system and observing the navigation frame will therefore enable determining the current position and orientation of the scanner. Systems operating as described here are commercially available, and the same approach may be adapted to solve the laser radar challenge discussed above.

However, while such a 'navigation frame' solution offers advantages in that the scanner can be observed by the cameras from any direction, it also leads to a solution that is costly to implement, because many targets and many cameras are typically needed to secure the required coverage for any orientation—since the scanner has a fixed field of view, it requires a truly omnidirectional tracking solution. The laser radar, on the other hand, has a steerable laser beam so a wider range of positions and orientations are suitable to measure a given feature, and a truly omnidirectional solution is not required.

Also, laser radars are known to exhibit some change in their internal coordinate system as a function of orientation. Their specifications are typically only valid for a given range of orientations, and their internal coordinate system may exhibit an offset when this range is exceeded—as may be necessary for access in e.g. an automotive production cell.

When using the laser radar itself to measure reference targets to get into the object coordinate system, this effect is largely eliminated as the reference targets defining the object coordinate system are also measured in this potentially offset coordinate system so that subsequent laser radar measurements taken from the same position will also be offset by the same amount and the error is compensated. If, however, a navigation frame method was applied for a laser radar, this error would not be compensated for and poor accuracy would result. Adapting the known method for fast device navigation will therefore not provide optimal results for the laser radar.

EP 0 607 303 shows that the relative position and orientation of an object containing at least three fiducials and a camera observing said fiducials, can be determined in all six degrees of freedom relative to the camera's fixed internal coordinate system. The camera measures the spatial direction to each of the fiducials, and the position and orientation of the object containing the fiducials can be determined. This requires that the fiducials are not on a line, and that the positions of the fiducials are known relative to each other—that is, that the fiducials are in a pre-determined or known pattern. However, EP 0 607 303 does not show how errors can be compensated when a laser radar is moved around.

It is the objective technical problem to overcome the disadvantages described above. In particular it is the objective technical problem to provide a fast and precise spatial measurement of objects. The objective technical problem is solved by the features of the independent claims.

One aspect of the invention is directed to a method for determining a current position and/or orientation of a laser radar relative to an object. The method may be executed by a computer. A camera system is attached to the laser radar. In the method, the position and/or orientation of the camera system relative to the object is determined by obtaining one or more images of at least three reference targets having a fixed spatial relationship to the object. The relative spatial relationship and/or the position of the at least three reference targets to each other is obtained from a storage. The position and/or orientation of the reference targets relatively to the camera is determined by using the relative spatial relationship of the at least three reference targets to each other and the observed spatial directions from the camera to each of the at least three reference targets. Further, a spatial relationship between the camera system and the laser radar is obtained from a storage. The spatial position and/or orientation of the object relatively to the laser radar is calculated by using the position and/or orientation of the object relatively to the camera system and the spatial relationship between the camera system and the laser radar.

Thereby, a method is provided, that allows a measurement system including a laser radar to determine its position precisely and quickly in relation to an object. The inaccuracies of a robot moving the laser radar (and the camera system) are avoided, since the camera system provides immediate measurement of the current position and/or orientation of the laser radar relative to the object. Hence, a laser radar based measurement system that enables rapid yet precise XYZ measurements from a robot mounted laser radar is provided even when multiple robot movements are required, enabling the use of the laser radar in applications where it has previously not been suitable. This allows the use of simple, inexpensive robots.

The at least three reference targets are not in a line. The storage may be an electronic storage having for example volatile or nonvolatile memory. The data in the storage may be obtained from a server. The calculation of the position and/or orientation of the reference targets relative to the camera system may be in a coordinate system of the camera system. The storage of the spatial relationship between the camera system and the laser radar may be the same storage as mentioned above or, alternatively, a different storage.

In a preferred embodiment the method includes additionally the step of moving the camera system with a robot from a first position to a second position, wherein the second position is the current position.

In a preferred embodiment, the current position and/or orientation of the laser radar is determined in reaction to the movement of the camera and laser radar with the robot. In a particularly preferred embodiment, the position and/or orientation is determined in reaction to a determination that the movement has ended. Thereby, the current position and/or orientation of the laser radar is always known. Additionally or alternatively, the position is determined during movement by the robot.

In a preferred embodiment the camera system is fixedly attached to a beam steering mechanism of the laser radar. The beam steering mechanism is in particular a mirror or a prism. For example, the camera system may be attached to a backside of a mirror. When a position determination with the cameras is made, the mirror may be flipped around. In this embodiment, it is simple to determine the current position and orientation of the camera system. In this case the orientation of the mirror (or prism) influences the spatial relationship between the coordinate systems of the laser radar and the camera system. The spatial relationship (e.g. transformation matrices) may be calculated from the positional offset of the camera system and the current orientation of the mirror.

In a preferred embodiment the camera system is fixedly mounted to a body of the laser radar such that the spatial relationship between the camera system and the laser radar is fixed. This may mean that a spatial relationship between a camera system coordinate system and a laser radar coordinate system is fixed.

In a preferred embodiment the at least three targets are on the object. In particular, the at least three targets are attached to the object and are defined by known features of the object, i.e. by corners of the object.

In a preferred embodiment, the camera system comprises a wide lens camera and/or two or more cameras with different fields of view. Thereby, a large field of view is provided such that the camera system is able to record the targets.

Determining said spatial relationship between the laser radar and camera system may involve measuring the same points or features with both the camera system and the laser radar, keeping both systems stationary. Due to the different natures of these two measurement systems, this may not be feasible, and instead points or features can be measured that are in known spatial relations to each other.

In a preferred embodiment, the spatial relationship between the camera system and the laser radar in the storage is generated by determining the spatial relationship between the camera system and the laser radar for one or more intended measurement positions of the robot such that the spatial relationship for that position can be used for subsequent measurements from said intended measurements positions. Thereby, any error in the internal laser radar coordinate system, e.g. from excessive tilt, will be compensated for.

A spatial relationship as mentioned herein may refer to a coordinate system transformation, in particular a coordinate transformation matrix or matrices. For example, when the spatial relationship between the camera system and the laser radar is determined a coordinate transformation matrix may be determined that allows a transformation of the coordinates from the camera system to the coordinates of the laser radar.

A reference target may be any physical entity or element suitable for precise measurement by a measurement system.

One or more or all of the targets may comprise a fiducial. A fiducial is defined as an element suitable for precise measurement by a camera-based measurement system. A fiducial may be an object placed in the field of view of an imaging system which appears in the image produced, for use as a point of reference or measure. It may be placed into or on the object.

The term target therefore includes fiducials, while some targets may not be fiducials. Examples of targets include e.g. tooling balls, nests, scribe lines and the like. Examples of fiducials include e.g. photogrammetry markers and light-emitting diodes.

Fiducials are suitable for measurement by a camera-based measurement system, but may not be suitable for measurement by a laser radar. Physical targets are generally suitable for measurement by a laser radar, but may not be suitable for measurement by a camera-based measurement system.

In a preferred embodiment at least one of the reference targets comprises at least three fiducials observable by the camera system and a physical element measurable by the laser radar, all in positions known relative to each other. In example embodiments, the at least one physical element may be a tooling ball. Thereby, the camera system can quickly measure the reference target by observing the fiducials, while the laser radar can measure the physical element. Since the relationship between the fiducials and the physical element is known, said reference target is suitable for precise measurements by both systems and enables both systems to determine the location of the center of the tooling ball.

In an alternative preferred embodiment, at least one of the targets, preferably at least three targets, comprises a sphere with a fiducial. The fiducial may be a light-emitting diode or an optical marker. The fiducial may be placed at the sphere's center, enabling the camera to determine the spatial direction to said at least three reference targets from one side. Said reference target is used to enable the laser radar to measure the center by scanning the sphere surface. Provided the spatial position of the fiducial observed with the camera is known relative to at least two other reference targets also observed, a spatial relationship between the camera system and the laser radar may be obtained prior to a measurement.

In a preferred embodiment, the reference targets are nests, in which spherically mounted fiducials are observable by the camera system or physical spheres of the same size are measurable by the laser radar.

A further aspect of the invention relates to a method for determining measurement of an object including the steps of determining a current position and/or orientation of the object as described above and measuring one or more physical elements of the object. The physical element may be measured after the spatial position and/or orientation of the laser radar relative to the object is determined.

A further aspect of the invention relates to a computer program comprising instructions which, when the program is executed by computer, cause the computer to carry out the method as described above.

A further aspect of the invention relates to a system comprising means for carrying out the method as described above. Preferably, the system comprises a camera system and a holder for mounting the camera to a laser radar. Optionally, the system also comprises the laser radar.

Figure 3:
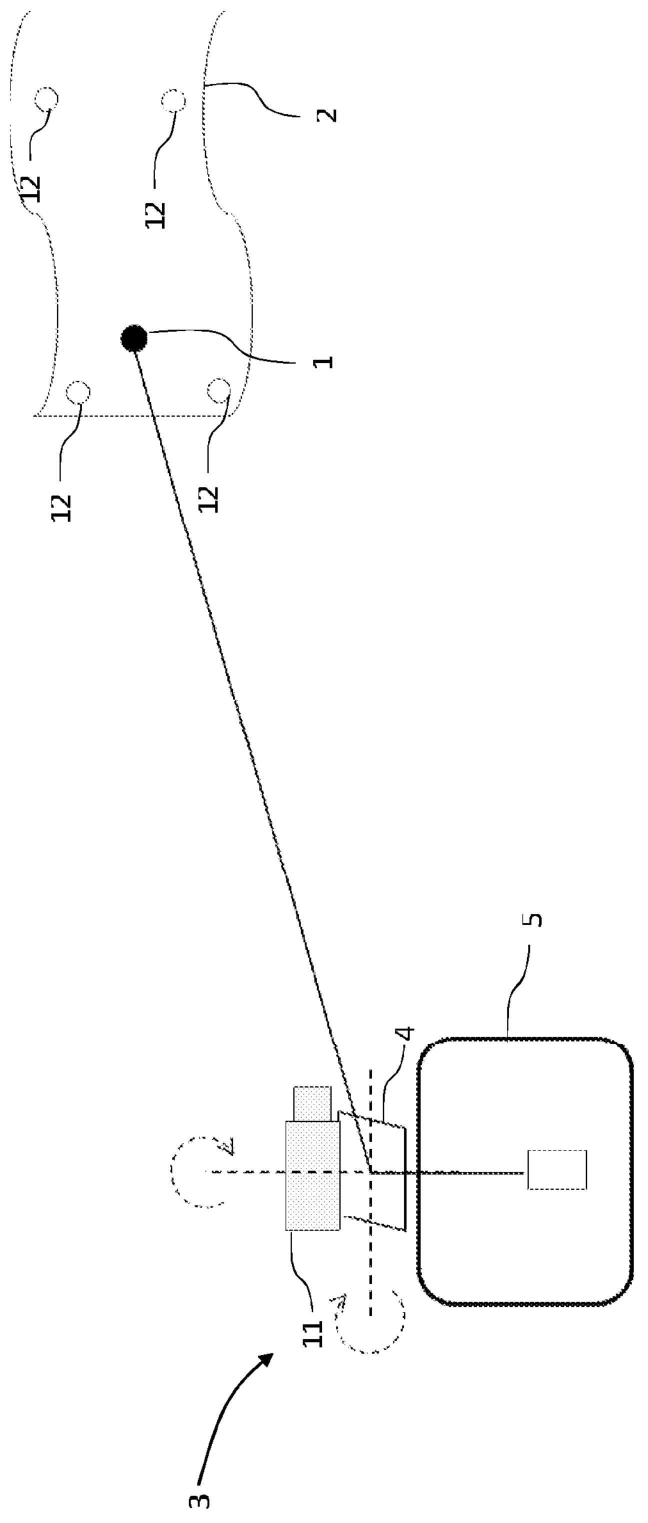
FIG. 3 shows a laser radar with a camera according to a first embodiment of the invention.

FIG. 3 shows one embodiment, where a camera 11 is mounted fixedly to the steering mechanism for the laser beam in such a way that the camera moves together with the mirror or prism 4. For example, the camera 11 may be mounted on a backside of the mirror 4. FIG. 3 also shows a number of reference targets 12 placed on or about the object 2 to be measured. The object 2 may, for example, be a part of an auto body.

When the laser radar 3 in FIG. 3 is moved, the camera 11 will detect reference targets 12 in a different position and orientation than before the move and will therefore be able to calculate the precise new position and orientation of the camera. Provided that the relationship between the fixed internal coordinate system of the camera and that of the laser radar has been determined beforehand, the new position and orientation of the laser radar can also be calculated in relationship to the object's coordinate system, and it is therefore possible to transform all subsequent laser radar measurements into the same coordinate system as before the move was made—without losing time on sequential laser radar measurements of reference targets.

Notice that in FIG. 3, the relationship between the fixed internal coordinate system of the camera and the coordinate system of the laser radar is not constant, but the relationship can nevertheless always be determined since the camera and therefore its' coordinate system moves together with the mirror or prism 4. The current relationship can therefore always be determined by reading the vertical 8 and horizontal 9 angles of the mirror or prism relative to the main body of the laser radar 3, in the same way as is part of the internal workings of the laser radar.

Figure 4:
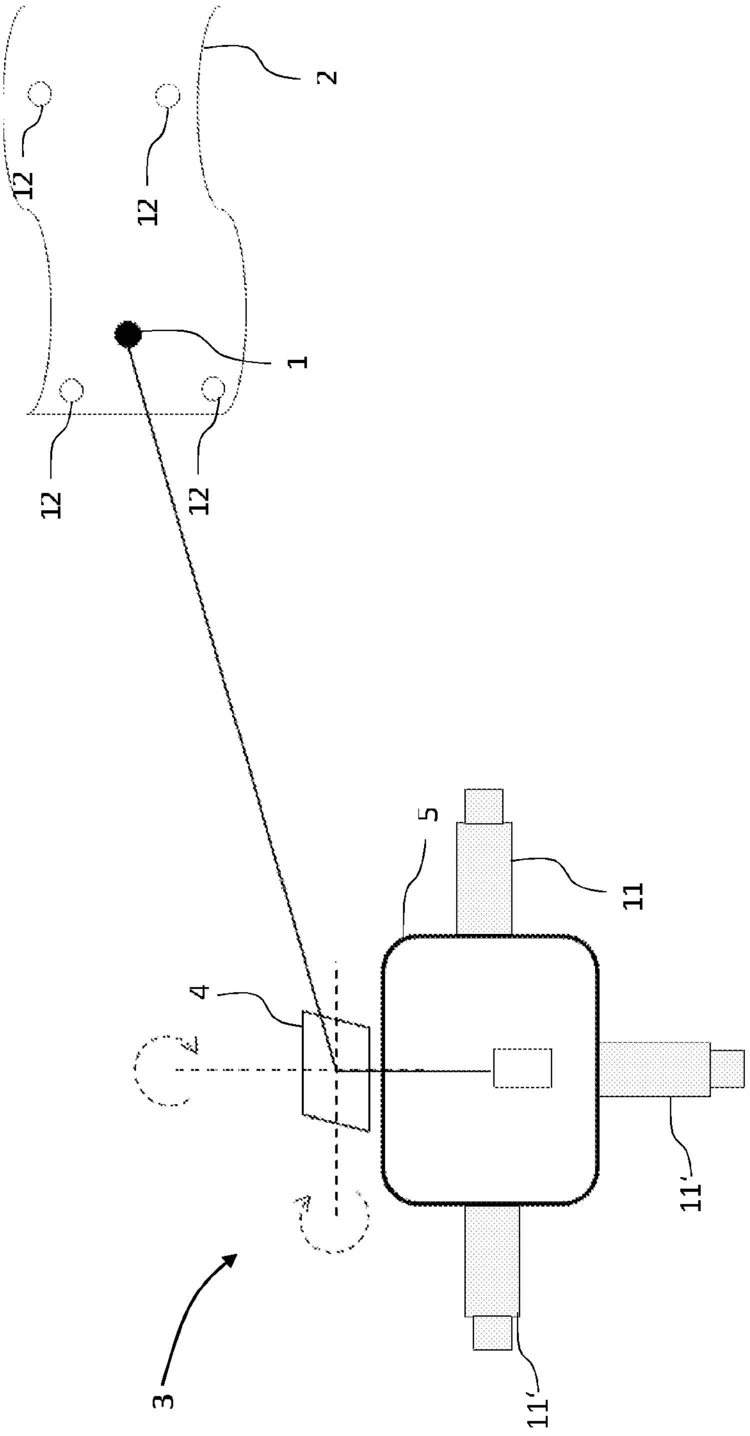
FIG. 4 shows a laser radar with a camera according to a second embodiment of the invention.
Figure 5:
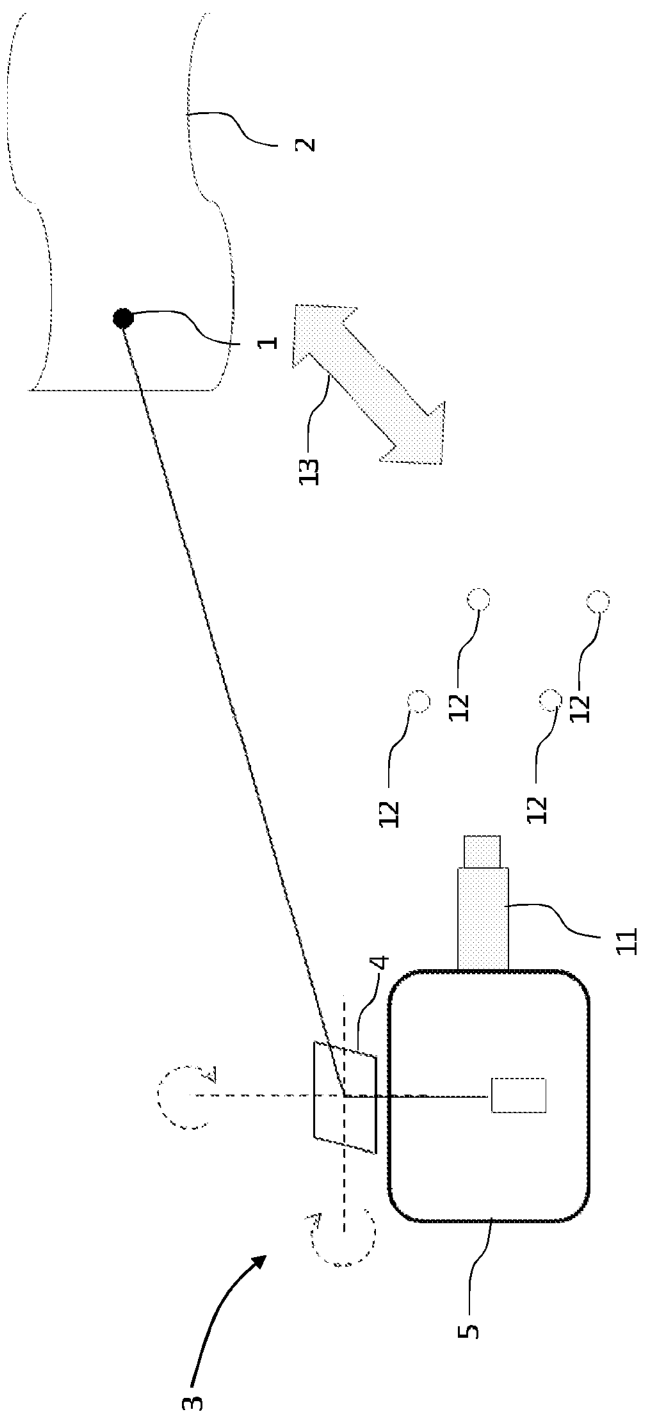
FIG. 5 shows a laser radar with multiple cameras according to a third embodiment of the invention.

FIGS. 4 and 5 show alternative embodiments, where a camera 11 is mounted fixedly to the main, fixed body 5 of the laser radar 3. The camera 22 observes reference targets 12.

In these embodiments, therefore, the relationship between the fixed internal coordinate system of each camera and the coordinate system of the laser radar is constant, independent of the movements of the laser radar mirror or prism 4. In some embodiments, an internal coordinate system of the laser radar may shift as will be explained below.

In FIG. 4, the reference targets are placed on or about the object to be measured 2. To ensure that at least three reference targets 12 are inside the camera's 11 field of view for all relevant laser radar positions and orientations, it may be necessary to use a wide angle lens, and/or to use several cameras 11' with different fields of view, as shown in FIG. 4. In a production cell of a factory, the laser radar positions can be pre-planned and the number of cameras, their required positioning and optics can be configured as needed.

In FIG. 5, the reference targets are placed to optimize the camera observations—such as ensuring a clear field-of-view, and/or optimizing accuracy for a given camera specification by being suitably close to the camera and providing an optimized coverage of the available camera field-of-view. Notice that the reference targets 12 must also in this embodiment be in positions that are known relative to the object 2 to be measured, as indicated by the arrow 13.

An element of the present disclosure is to determine the relationship between the fixed internal coordinate system of the camera 11, and that of the laser radar—fixed to the laser positioning system body 5.

If the camera is fixed to the radar body 5, the relationship can conceptually be found by measuring the same at least three—not on a line—reference targets 12 with the camera 11 and the laser radar 3. In practice, this may however not be possible as the camera 11 may not be suitable for precise measurement of reference targets 12 that are suitable for precise measurement by the laser radar 3, and vice-versa. This difficulty may be overcome in various ways. Nests are commercially available that will position a sphere with very high repeatability. A special semi-spherical target could have a fiducial suitable for measurement by the camera mounted at its' center, yet if rotated would present at least a half-sphere for precision measurement by the laser radar 3. If placed in said nest, this alignment target would enable both the camera and the laser radar to measure the same sphere center point with high accuracy.

Alternatively, referring to EP 0 607 303, a probing device for the camera could be introduced to probe physical reference targets—such as tooling balls—that are also suitable for measurement by the laser radar 3.

Also, pre-calibrated reference targets consisting of reference targets 12 suitable for each system could be used, where e.g. a tooling ball suitable for measurement with the laser radar was placed in a known position relative to at least three fiducials—not on a line—that were suited for measurement with the camera.

If the camera is not fixed to the laser radar body 5 but rather moves with the beam steering mirror or prism 4, the same principles apply but with the added need to also consider the current readings of the horizontal 8 and vertical 9 angles.

This can be done by carrying out the measurements sequentially and from the single laser radar position 3—that is, first measuring with the laser radar 3, then locking the laser radar's 3 beam steering while carrying out the measurements with the camera 11 so that there is a single, fixed relationship between the internal camera coordinate system and the laser radar coordinate system during these camera measurements. Since the camera 11 has a relatively wide field-of-view, it will be possible to measure the reference targets 12 from a single camera position.

For all of these embodiments, the relationship between the laser radar internal coordinate system and the object coordinate system can be determined once and then applied for all laser radar positions.

Alternatively, and keeping in mind that the laser radar may exhibit some shift in its internal coordinate system when tilted excessively, the relationship between the laser radar internal coordinate system and the object coordinate system can be determined for each intended laser radar position and the appropriate relationship be used for subsequent object measurements in each laser radar position. This determination may be made in advance, e.g. during a calibration of the system.

What is claimed is:

1. A method for determining a current position and orientation of an object relatively to a laser radar and for determining a measurement of the object, wherein a camera system is attached to the laser radar, the method comprising:
- determining the position and orientation of the object relatively to the camera system by:
  - obtaining one or more images of the object of the camera system,
  - observing at least three reference targets having a predetermined and fixed spatial relationship to the object in the one or more images,
  - obtaining a relative spatial relationship of the at least three reference targets on the object to each other from a storage, and
  - calculating the position and orientation of the three reference targets relatively to the camera system by using the relative spatial relationship of the at least three reference targets to each other and the detected at least three reference targets;
- obtaining a spatial relationship between the camera system and the laser radar from the storage;
- calculating the spatial position and orientation of the object relatively to the laser radar by using the position and orientation of the object relatively to the camera system and the spatial relationship between the camera system and the laser radar; and
- measuring a physical element of the object with the laser radar, wherein the measured physical element is distinct from a predefined reflective object and the at least three reference targets.

2. The method according to claim 1, additionally including the step of moving the camera system with a robot from a first position to a second position, wherein the second position is the current position.

3. The method according to claim 2, wherein the current position and orientation of the laser radar is determined in reaction to the movement of the camera system and the laser radar with the robot, and in particular in reaction to determination that the movement has ended.

4. The method according to claim 1, wherein the camera system is fixedly attached to a beam steering mechanism, in particular a mirror, of the laser radar.

5. The method according to claim 1, wherein the camera system is fixedly mounted to a body of the laser radar such that the spatial relationship between the camera system and the laser radar is fixed.

6. The method according to claim 1, wherein the at least three reference targets are on the object.

7. The method according to claim 6, wherein the at least three reference targets are attached to the object or are defined by features of the object.

8. The method according to claim 1, wherein the camera system comprises a wide lens camera and/or two or more cameras with different fields of view.

9. The method according to claim 1, wherein the spatial relationship between the camera system and the laser radar in the storage is generated by determining the spatial relationship between the camera system and the laser radar for one or more intended measurement positions of a robot before the measurement of the object such that the spatial relationship for the intended measurement positions is available for use for subsequent object measurements from said intended measurement positions.

10. The method according to claim 1, wherein at least one of the reference targets comprises of at least three fiducials observable by the camera system and one physical element measurable by the laser radar, in positions known relative to each other.

11. The method according to claim 1, wherein a reference target of the at least three reference targets, comprises a sphere with a fiducial placed at the sphere's center, enabling the camera system to observe said reference target and the laser radar to measure said reference target by scanning the spheres' surface, wherein the position of said reference target is known relative to at least two other reference targets observable with the camera system and not on a line with said reference target.

12. The method according to claim 1, wherein the reference targets are nests, in which spherically mounted fiducials are observable by the camera system, or physical spheres of the same size are measurable by the laser radar.

13. The method according to claim 1 further comprising:
determining a current position and orientation of a laser positioning system and,
measuring a physical element of the object.

14. A non-transitory computer-readable medium comprising instructions which, when executed by a processor, cause the processor to perform operations for determining a current position and orientation of an object relatively to a laser radar and for determining a measurement of the object, wherein a camera system is attached to the laser radar, the operations comprising:
determining the position and orientation of the object relatively to the camera system by:
obtaining one or more images of the object of the camera system,
observing at least three reference targets having a predetermined and fixed spatial relationship to the object in the one or more images,
obtaining a relative spatial relationship of the at least three reference targets on the object to each other from a storage, and
calculating the position and orientation of the three reference targets relatively to the camera system by using the relative spatial relationship of the at least three reference targets to each other and the detected at least three reference targets;
obtaining a spatial relationship between the camera system and the laser radar from the storage;
calculating the spatial position and orientation of the object relatively to the laser radar by using the position and orientation of the object relatively to the camera system and the spatial relationship between the camera system and the laser radar; and
measuring a physical element of the object with the laser radar, wherein the measured physical element is distinct from a predefined reflective object and the at least three reference targets.

15. A system comprising:
a processor;
a non-transitory computer-readable medium comprising instructions that, when executed by the processor, cause the processor to perform operations for determining a current position and orientation of an object relatively to a laser radar and for determining a measurement of the object, wherein a camera system is attached to the laser radar, the operations comprising:
determining the position and orientation of the object relatively to the camera system by:
obtaining one or more images of the object of the camera system,
observing at least three reference targets having a predetermined and fixed spatial relationship to the object in the one or more images,
obtaining a relative spatial relationship of the at least three reference targets on the object to each other from a storage, and
calculating the position and orientation of the three reference targets relatively to the camera system by using the relative spatial relationship of the at least three reference targets to each other and the detected at least three reference targets;
obtaining a spatial relationship between the camera system and the laser radar from the storage;
calculating the spatial position and orientation of the object relatively to the laser radar by using the position and orientation of the object relatively to the camera system and the spatial relationship between the camera system and the laser radar; and
measuring a physical element of the object with the laser radar, wherein the measured physical element is distinct from a predefined reflective object and the at least three reference targets.

16. The system of claim 15 further comprising a holder for mounting the camera system to the laser radar, wherein the system comprises the laser radar.

* * * * *